United States Patent
Koorapaty et al.

(10) Patent No.: US 10,149,286 B2
(45) Date of Patent: Dec. 4, 2018

(54) HARQ-ACK MULTIPLEXING IN PUSCH

(71) Applicant: TELEFONAKTIEBOLAGET LM ERICSSON (PUBL), Stockholm (SE)

(72) Inventors: Havish Koorapaty, Saratoga, CA (US); Jung-Fu Cheng, Fremont, CA (US); Cagatay Capar, Cukurova/Adana (TR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/593,822

(22) Filed: May 12, 2017

(65) Prior Publication Data
US 2017/0332374 A1   Nov. 16, 2017

Related U.S. Application Data

(60) Provisional application No. 62/336,116, filed on May 13, 2016.

(51) Int. Cl.
*H04W 4/00* (2018.01)
*H04W 72/04* (2009.01)
*H04L 1/00* (2006.01)
*H04L 1/18* (2006.01)
*H04L 5/00* (2006.01)

(52) U.S. Cl.
CPC ....... *H04W 72/0413* (2013.01); *H04L 1/0009* (2013.01); *H04L 1/0031* (2013.01); *H04L 1/0073* (2013.01); *H04L 1/1812* (2013.01); *H04L 1/1861* (2013.01); *H04L 5/001* (2013.01); *H04L 5/0055* (2013.01); *H04L 5/0057* (2013.01); *H04L 1/0067* (2013.01); *H04L 1/0071* (2013.01)

(58) Field of Classification Search
CPC ............. H04W 72/0413; H04L 1/0009; H04L 1/1812; H04L 5/0055; H04L 5/0057
See application file for complete search history.

(56) References Cited

U.S. PATENT DOCUMENTS

| 9,338,768 | B2* | 5/2016 | Han | H04W 72/0413 |
| 9,380,442 | B2* | 6/2016 | Turtinen | H04W 8/005 |
| 9,438,407 | B2* | 9/2016 | Li | H04W 52/146 |
| 9,686,703 | B2* | 6/2017 | Kim | H04W 24/10 |
| 9,929,848 | B2* | 3/2018 | Dinan | H04L 69/22 |
| 2010/0311431 | A1* | 12/2010 | Papasakellariou | H04B 1/713 455/450 |
| 2011/0205981 | A1* | 8/2011 | Koo | H04L 1/1671 370/329 |

(Continued)

OTHER PUBLICATIONS

Samsung, "Summary of Email Discussions on UCI Coding", 3GPP DRAT; R1-155446 JC VS SC, 3rd Generation Partnership Project (3GPP), Malmo, Sweden, Oct. 5-9, 2015.

(Continued)

*Primary Examiner* — Stephen M D Agosta

(57) ABSTRACT

A method of operating a wireless communication device comprises channel coding Channel State Information (CSI) bits jointly with Hybrid Automatic Repeat Request (HARQ) Acknowledgement (HARQ-ACK) bits, multiplexing the jointly coded CSI and HARQ-ACK bits with coded data bits, and transmitting the multiplexed coded CSI and HARQ-ACK bits and coded data bits on a physical uplink shared channel (PUSCH).

17 Claims, 18 Drawing Sheets

☐ DMRS
☐ PUSCH data
☐ CSI (CQI/PMI)
☐ HARQ-ACK
☐ RI

(56) References Cited

U.S. PATENT DOCUMENTS

| | | | | |
|---|---|---|---|---|
| 2011/0269490 | A1* | 11/2011 | Earnshaw | H04L 1/0026 455/509 |
| 2015/0110029 | A1* | 4/2015 | Hwang | H04L 1/0026 370/329 |
| 2015/0117239 | A1* | 4/2015 | Lindoff | H04W 72/08 370/252 |
| 2016/0183244 | A1* | 6/2016 | Papasakellariou | H04L 5/001 370/329 |

OTHER PUBLICATIONS

LG Electronics, "UCI Transmission on PUSCH for Rel-13 CA", 3GPP DRAFT; R1-13 CA, 3rd generation Partnership Project (3FPP), Mobile Competence Centre: Anaheim USA, Nov. 15-22, 2015.

ETSI, "Evolved Universal Terrestrial Radio Access (E-UTRA); Multiplexing and channel coding", 3GPP TS 36.212, V13.0.0, 3rd Generation Partnership Project; Technical Specification Group Radio Access Network; Radio Resource Control (RRC), Release 13, Jan. 2016.

* cited by examiner

HARQ-ACK MULTIPLEXING IN PUSCH

CROSS-REFERENCE TO RELATED APPLICATIONS

This application claims priority to U.S. Provisional Patent Application No. 62/336,116 filed on May 13, 2016, the subject matter of which is hereby incorporated by reference in its entirety.

TECHNICAL FIELD

The disclosed subject matter relates generally to telecommunications. Certain embodiments relate more particularly to methods and apparatuses for performing Hybrid Automatic Repeat Request (HARQ) Acknowledgement (HARQ-ACK) multiplexing procedures in a physical uplink shared channel (PUSCH).

BACKGROUND

Long Term Evolution (LTE) uses Orthogonal Frequency Division Multiplexing (OFDM) in the downlink and Discrete Fourier Transform (DFT)-spread OFDM (also referred to as single-carrier FDMA (SC-FDMA)) in the uplink. Figure (FIG. 1 illustrates one type of LTE downlink physical resource. The LTE downlink physical resource can be seen as a time-frequency grid, where each resource element corresponds to one OFDM subcarrier during one OFDM symbol interval.

FIG. 2 illustrates the LTE time-domain structure. In the time domain, LTE downlink transmissions are organized into radio frames of 10 ms, each radio frame 210 consisting of ten equally-sized subframes of length $T_{subframe}=1$ ms, in the illustrated example embodiment.

In the LTE system, HARQ protocol is used to enhance transmission reliability. FIG. 3 illustrates HARQ operations in LTE. As depicted, when an initial transmission is not received correctly by the receiver, the receiver stores the received signal in a soft buffer and signals to the transmitter of such unsuccessful transmission. The transmitter can then retransmit the information (referred to as a transport block in LTE specifications) using the same channel coded bits or different channel coded bits. The receiver can then combine the retransmission signal with that stored in the soft buffer. Such combining of signals greatly enhances the reliability of the transmission.

In LTE, the ACK/NAK feedback is generally sent by the UE using one of two approaches depending on whether the UE is simultaneously transmitting a physical uplink shared channel (PUSCH):
  If the UE is not transmitting a PUSCH at the same time, the ACK/NAK feedback is sent via a physical uplink control channel (PUCCH).
  If the UE is transmitting a PUSCH simultaneously, the ACK/NAK feedback is sent via the PUSCH.

The use of LTE carrier aggregation (CA), introduced in Rel-10 and enhanced in Rel-11, offers means to increase the peak data rates, system capacity and user experience by aggregating radio resources from multiple carriers that may reside in the same band or different bands and, for the case of inter-band TDD CA, may be configured with different UL/DL configurations. In Rel-12, carrier aggregation between TDD and FDD serving cells is introduced to support UE connecting to them simultaneously.

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, a new study item was carried out in 3GPP on extending LTE to exploit unlicensed spectrum in addition to licensed spectrum.

The 3GPP work on "Licensed-Assisted Access" (LAA) intends to allow LTE equipment to also operate in the unlicensed radio spectrum. Candidate bands for LTE operation in unlicensed spectrum include 5 GHz, 3.5 GHz, etc. Unlicensed spectrum is used as a complement to the licensed spectrum or allows completely standalone operation.

FIG. 4 illustrates LAA in unlicensed spectrum using LTE carrier aggregation. LAA in unlicensed spectrum implies that a UE is connected to a PCell in the licensed band and one or more SCells in the unlicensed band. In this description, a secondary cell in unlicensed spectrum is referred to as an LAA secondary cell (LAA SCell). The LAA SCell may operate in DL-only mode or operate with both UL and DL traffic. Moreover, in future scenarios LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

To coexist fairly with the Wi-Fi system, transmission on the SCell conforms to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms according to EN 301.893.

In addition to standardization work for LAA in the 3GPP forum, other standard setting bodies are also working on related technologies. For instance, Multefire Alliance Forum is working on adding more procedures to the 3GPP LAA system to enable standalone operations of LTE in unlicensed spectrum.

In Rel-13, Licensed-Assisted Access (LAA) has attracted significant interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Rel-13. The objective is to support up to 32 carriers in both UL and DL.

To support up to 32 carriers in DL, the UCI feedback, e.g. HARQ-ACK bits will increase significantly. For each DL subframe, there is 1 or 2 HARQ-ACK bits per carrier depending on if spatial multiplexing is supported or not. Hence, for FDD, there can be up to 64 HARQ-ACK bits if there are 32 DL carriers. The number of HARQ-ACK bits for TDD is even larger to hundreds of bits depending on the TDD configuration. Therefore, new PUCCH format(s) supporting larger payload is necessary. Similarly, the piggyback of increased number of UCI bits also motivates the enhancements on UCI feedback on PUSCH.

Uplink transmissions are dynamically scheduled. For example, in each downlink subframe, the base station transmits control information about which terminals should transmit data to the eNB in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS) if the SRS is configured. DMRS are used for coherent demodulation of PUSCH and PUCCH data, whereas SRS is not associated with any data or control information but is generally used to estimate the uplink channel quality for purposes of frequency-selective scheduling.

FIG. 5 illustrates multiplexing data and control information in PUSCH. Specifically, an example uplink subframe with only data, DMRS and SRS is depicted. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

In LTE, control information can also be carried in the PUSCH instead of the PUCCH. Thus, data and control information can be multiplexed in the PUSCH. The control information can include e.g.:
- Channel state information (CSI) which may further be comprised of channel quality indicator (CQI) and precoding matrix indicator (PMI) bits
- Rank indicator (RI)
- HARQ-ACK feedback According to LTE specifications TS 36.212, v.13.0.0:
- The channel coded CSI bits are multiplexed with the channel coded data bits. The channel coded CSI bits are placed (i.e. assigned to resource elements) before the channel coded data bits. These bits are interleaved together into the available REs in the PUSCH. FIG. 6 illustrates multiplexing data and control information bits in PUSCH, where the CSI (CQI/PMI) bits occupy the first few rows of REs and data bits occupy most of the rest.
- Coded RI bits are placed in PUSCH SCFDMA symbol #1, #5, #8 and #12 starting from the bottom. The REs occupied by the coded RI bits are avoided by the coded CSI and data bits.
- Coded HARQ-ACK feedback bits are placed in PUSCH SCFDMA symbol #2, #4, #9 and #11 starting from the bottom. The REs occupied by the coded HARQ-ACK feedback bits are NOT avoided by the coded CSI and data bits. In fact, the LTE specifications TS 36.212 describes that coded HARQ-ACK feedback bits overwrite the REs that already contain coded data bits.

A data and control information multiplexing procedure was designed in LTE Rel-8 when the envisioned HARQ-ACK feedback sizes were rather small, e.g., 1-2 bits. With such small HARQ-ACK feedback size, the overwriting of PUSCH data REs introduces negligible performance losses.

SUMMARY

In some embodiments of the disclosed subject matter, a method of operating a wireless communication device comprises channel coding CSI bits jointly with HARQ-ACK bits, multiplexing the jointly coded CSI and HARQ-ACK bits with coded data bits, and transmitting the multiplexed coded CSI and HARQ-ACK bits and coded data bits on a PUSCH.

In certain related embodiments, the CSI bits comprise CQI bits.

In certain related embodiments, channel coding the CSI bits jointly with the HARQ-ACK bits comprises appending a sequence of HARQ-ACK bits at the end of a sequence of channel quality bits to produce a joint sequence, and channel coding the joint sequence.

In certain related embodiments, multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements.

In certain related embodiments, the assigning comprises interleaving the coded CSI and HARQ-ACK bits with the coded data bits such that the coded CSI and HARQ-ACK bits are assigned to the first set of resource elements and the coded data bits are assigned to the second set of resource elements.

In certain related embodiments, the interleaving comprises performing a channel interleaving procedure in which HARQ-ACK bits are treated as being absent.

In certain related embodiments, the method further comprises receiving higher layer signaling from a radio network node, the higher layer signaling indicating that the assigning is to be performed, and performing the assigning in response to the higher layer signaling. In certain related embodiments, the multiplexing is triggered by PDCCH or ePDCCH signaling.

In certain related embodiments, the method further comprises determining whether the number of HARQ-ACK bits or coded HARQ-ACK bits is greater than a threshold value, and performing the channel coding HARQ-ACK bits jointly with the CSI bits as a consequence of the determining. The threshold value may be e.g. 22.

In some embodiments of the disclosed subject matter, a wireless communication device comprises at least one memory, at least one processor, and at least one transceiver collectively configured to channel code CSI bits jointly with HARQ-ACK bits, multiplex the jointly coded CSI and HARQ-ACK bits with coded data bits, and transmit the multiplexed coded CSI and HARQ-ACK bits and coded data bits on a PUSCH.

In certain related embodiments, the CSI bits comprise CQI bits. In certain related embodiments, channel coding the CSI bits jointly with the HARQ-ACK bits comprises appending a sequence of HARQ-ACK bits at the end of a sequence of channel quality bits to produce a joint sequence, and channel coding the joint sequence.

In certain related embodiments, multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements.

In certain related embodiments, the assigning comprises interleaving the coded CSI and HARQ-ACK bits with the coded data bits such that the coded CSI and HARQ-ACK bits are assigned to the first set of resource elements and the coded data bits are assigned to the second set of resource elements.

In certain related embodiments, the interleaving comprises performing a channel interleaving procedure in which HARQ-ACK bits are treated as being absent.

In certain related embodiments, the at least one memory, at least one processor, and at least one transceiver are further collectively configured to receive higher layer signaling from a radio network node, the higher layer signaling indicating that the assigning is to be performed, and perform the assigning in response to the higher layer signaling.

In certain related embodiments, the multiplexing is triggered by PDCCH or ePDCCH signaling.

In certain related embodiments, the at least one memory, at least one processor, and at least one transceiver are further collectively configured to determine whether the number of HARQ-ACK bits or coded HARQ-ACK bits is greater than a threshold value, and to perform the channel coding HARQ-ACK bits jointly with the CSI bits as a consequence of the determining. The threshold value may be e.g. 22.

In some embodiments of the disclosed subject matter, a method of operating a wireless communication device comprises multiplexing coded HARQ-ACK bits, coded CSI bits, and coded data bits, wherein the multiplexing comprises assigning the CSI bits for transmission on a first set of resource elements in a PUSCH, and thereafter assigning the coded HARQ-ACK bits and coded data bits for transmission on respective second and third sets of resource elements in the PUSCH, wherein the first, second and second sets of resource elements do not include any of the same resource elements, and transmitting the multiplexed coded HARQ-ACK bits, coded CSI bits, and coded data bits on the PUSCH.

In certain related embodiments, the multiplexing comprises assigning the CSI bits for transmission on a first set of resource elements in the PUSCH, and thereafter assigning the coded HARQ-ACK bits for transmission on the second set of resource elements in the PUSCH, and thereafter assigning the coded data bits for transmission on the third set of resource elements in the PUSCH.

In certain related embodiments, the multiplexing comprises assigning the CSI bits for transmission on a first set of resource elements in the PUSCH, and thereafter assigning the coded data bits for transmission on the third set of resource elements in the PUSCH, and thereafter assigning the coded HARQ-ACK bits for transmission on the second set of resource elements in the PUSCH.

In certain related embodiments, the multiplexing further comprises configuring an input for an interleaver, comprising the coded CSI bits, followed by the HARQ-ACK bits, followed by the coded data bits.

In certain related embodiments, the multiplexing further comprises configuring an input for an interleaver, comprising the coded CSI bits, followed by the coded data bits, followed by the HARQ-ACK bits.

In certain related embodiments, the method further comprises receiving higher layer signaling from a radio network node, the higher layer signaling indicating that the assigning is to be performed, and performing the multiplexing in response to the higher layer signaling. In certain related embodiments, the higher layer signaling comprises RRC signaling. In certain related embodiments, the multiplexing is triggered by PDCCH or ePDCCH signaling.

In certain related embodiments, the method further comprises determining whether the number of HARQ-ACK bits or coded HARQ-ACK bits is greater than a threshold value, and performing the multiplexing as a consequence of the determination. The threshold value may be e.g. 22.

In some embodiments of the disclosed subject matter, a wireless communication device comprises at least one memory, at least one processor, and at least one transceiver collectively configured to multiplex coded HARQ-ACK bits, coded CSI bits, and coded data bits, wherein the multiplexing comprises assigning the CSI bits for transmission on a first set of resource elements in a PUSCH, and thereafter assigning the coded HARQ-ACK bits and coded data bits for transmission on respective second and third sets of resource elements in the PUSCH, wherein the first, second and second sets of resource elements do not include any of the same resource elements, and transmit the multiplexed coded HARQ-ACK bits, coded CSI bits, and coded data bits on a PUSCH.

In certain related embodiments, the multiplexing comprises assigning the CSI bits for transmission on a first set of resource elements in the PUSCH, and thereafter assigning the coded HARQ-ACK bits for transmission on the second set of resource elements in the PUSCH, and thereafter assigning the coded data bits for transmission on the third set of resource elements in the PUSCH.

In certain related embodiments, the multiplexing comprises assigning the CSI bits for transmission on a first set of resource elements in the PUSCH, and thereafter assigning the coded data bits for transmission on the third set of resource elements in the PUSCH, and thereafter assigning the coded HARQ-ACK bits for transmission on the second set of resource elements in the PUSCH.

In certain related embodiments, the multiplexing further comprises configuring an input for an interleaver, comprising the coded CSI bits, followed by the HARQ-ACK bits, followed by the coded data bits. In certain related embodiments, the multiplexing further comprises configuring an input for an interleaver, comprising the coded CSI bits, followed by the coded data bits, followed by the HARQ-ACK bits.

In certain related embodiments, the wireless communication device further comprises receiving higher layer signaling from a radio network node, the higher layer signaling indicating that the assigning is to be performed, and performing the multiplexing in response to the higher layer signaling. The higher layer signaling may be e.g. RRC signaling.

In certain related embodiments, the multiplexing is triggered by PDCCH or ePDCCH signaling.

In certain related embodiments, the at least one memory, at least one processor, and at least one transceiver are collectively configured to determine whether the number of HARQ-ACK bits or coded HARQ-ACK bits is greater than a threshold value, and perform the multiplexing as a consequence of the determination. The threshold value may be e.g. 22.

In some embodiments of the disclosed subject matter, a method of operating a wireless communication device comprises multiplexing coded RI bits, HARQ-ACK bits, coded CSI bits, and coded data bits, wherein the multiplexing comprises assigning the RI bits for transmission on a first set of resource elements in a PUSCH, and thereafter assigning the CSI bits and coded data bits for transmission on a second set of resource elements in the PUSCH and the coded HARQ-ACK bits for transmission on a third set of resource elements in the PUSCH, wherein the first, second and third sets of resource elements do not include any of the same resource elements, and transmitting the multiplexed coded RI bits, coded HARQ-ACK bits, coded CSI bits, and coded data bits on the PUSCH.

In certain related embodiments, the multiplexing further comprises configuring an input for an interleaver, comprising the coded RI bits, followed by the coded CSI and data bits, followed by the HARQ-ACK bits.

In certain related embodiments, the method further comprises receiving higher layer signaling from a radio network node, the higher layer signaling indicating that the assigning is to be performed, and performing the multiplexing in response to the higher layer signaling. The higher layer signaling may comprise e.g. RRC signaling. In certain related embodiments, the multiplexing is triggered by PDCCH or ePDCCH signaling.

In certain related embodiments, the method further comprises determining whether the number of HARQ-ACK bits or coded HARQ-ACK bits is greater than a threshold value, and performing the multiplexing as a consequence of the determination. The threshold value may be e.g. 22.

In some embodiments of the disclosed subject matter, a wireless communication device comprises at least one memory, at least one processor, and at least one transceiver collectively configured to multiplex coded RI bits, HARQ-ACK bits, coded CSI bits, and coded data bits, wherein the multiplexing comprises assigning the RI bits for transmission on a first set of resource elements in a PUSCH, and thereafter assigning the CSI bits and coded data bits for transmission on a second set of resource elements in the PUSCH and the coded HARQ-ACK bits for transmission on a third set of resource elements in the PUSCH, wherein the first, second and third sets of resource elements do not include any of the same resource elements, and transmit the multiplexed coded RI bits, coded HARQ-ACK bits, coded CSI bits, and coded data bits on the PUSCH.

In certain related embodiments, the multiplexing further comprises configuring an input for an interleaver, comprising the coded RI bits, followed by the coded CSI and data bits, followed by the HARQ-ACK bits.

In certain related embodiments, the at least one memory, at least one processor, and at least one transceiver are further collectively configured to receive higher layer signaling from a radio network node, the higher layer signaling indicating that the assigning is to be performed, and perform the multiplexing in response to the higher layer signaling. The higher layer signaling may be e.g. RRC signaling. In certain related embodiments, the multiplexing is triggered by PDCCH or ePDCCH signaling.

In certain related embodiments, the at least one memory, at least one processor, and at least one transceiver are further collectively configured to determine whether the number of HARQ-ACK bits or coded HARQ-ACK bits is greater than a threshold value, and perform the multiplexing as a consequence of the determination. The threshold value may be e.g. 22.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Certain embodiments provide solutions for carrying HARQ-ACK feedback information in PUSCH. For instance, in certain embodiments, a wireless communication device jointly channel codes CSI and HARQ-ACK bits, then multiplexes the jointly coded bits with coded data bits and transmits the multiplexed bits on a PUSCH. This approach can avoid puncturing of the coded data bits by the HARQ-ACK bits. In certain other embodiments, a wireless communication device multiplexes coded HARQ-ACK bits, coded CSI bits, and coded data bits such that the HARQ-ACK bits do not puncture the coded data bits.

Certain embodiments are presented in recognition of shortcomings that the inventors have recognized in conventional approaches, such as the following examples. In 3GPP Rel-13, maximum 32 downlink carriers can be configured for one UE. To support such large feedback sizes, new PUCCH Format 4 and 5 were also introduced. Consider the example of the new PUCCH Format 4 which has 144 REs to carry coded HARQ-ACK feedback bits. If these HARQ-ACK feedback bits are carried in the PUSCH, then in each of the PUSCH symbols #2, #4, #9, and #11, 36 REs will be needed according to certain specifications. This will result in substantial overwriting (or puncturing) of the PUSCH data, which can cause severe performance losses.

Figure 1:
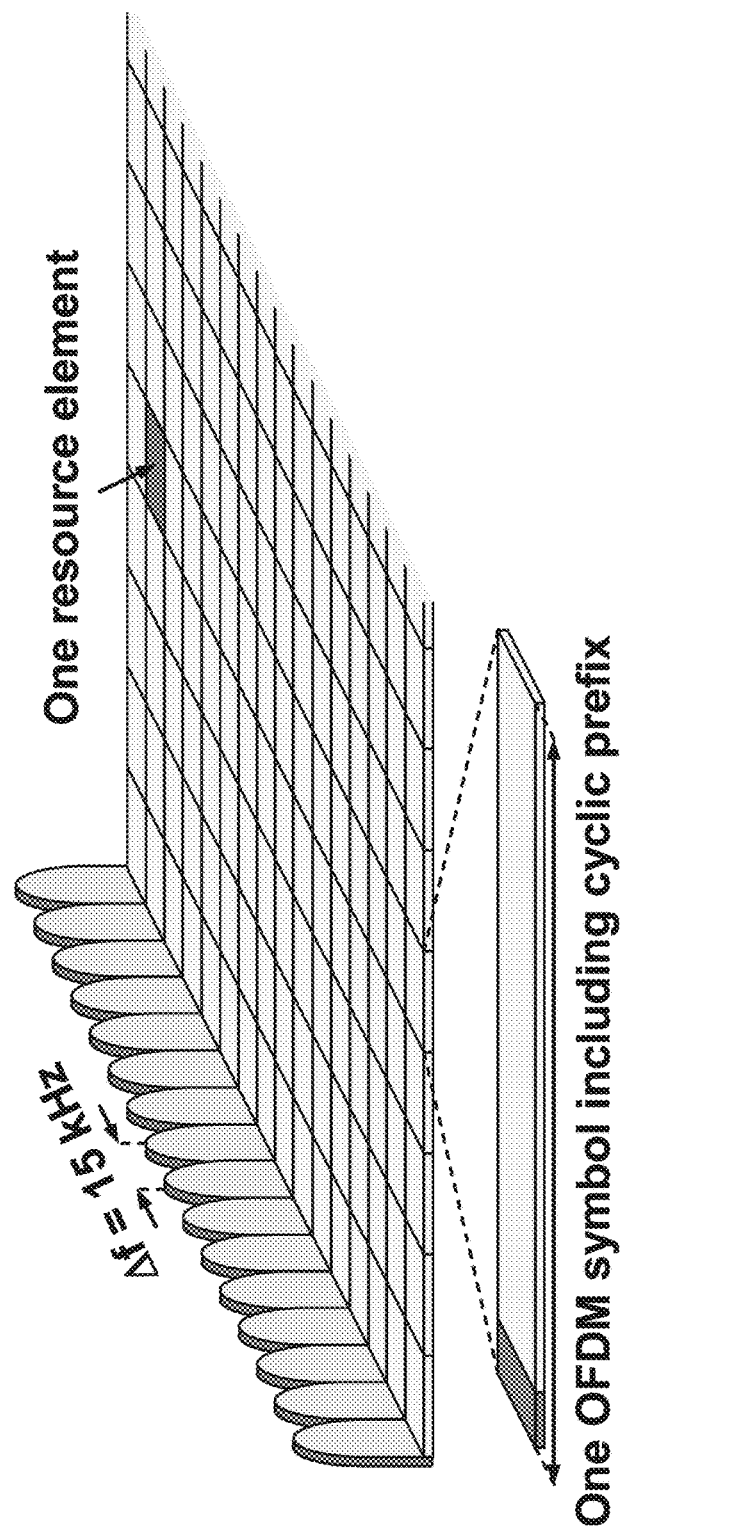
FIG. 1 illustrates an LTE downlink physical resource.
Figure 2:
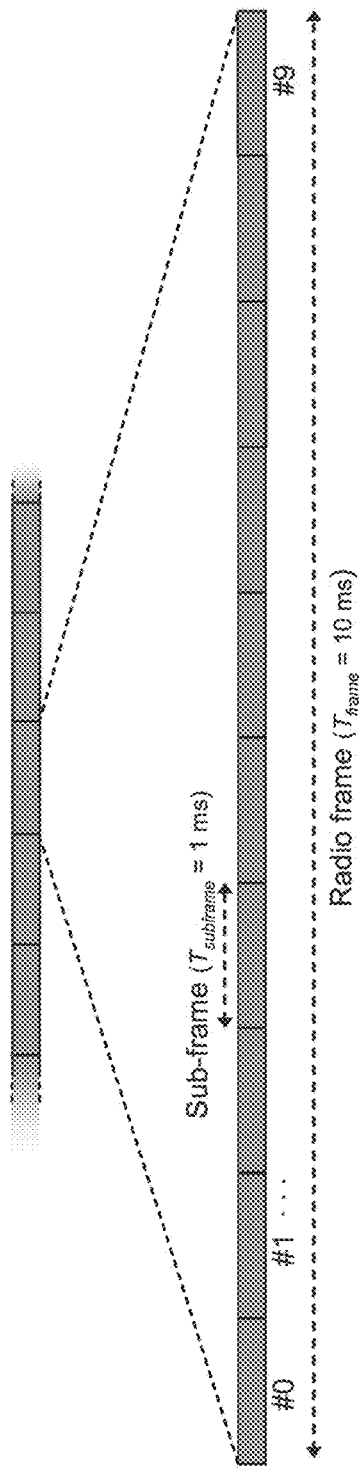
FIG. 2 illustrates the LTE time-domain structure.
Figure 3:
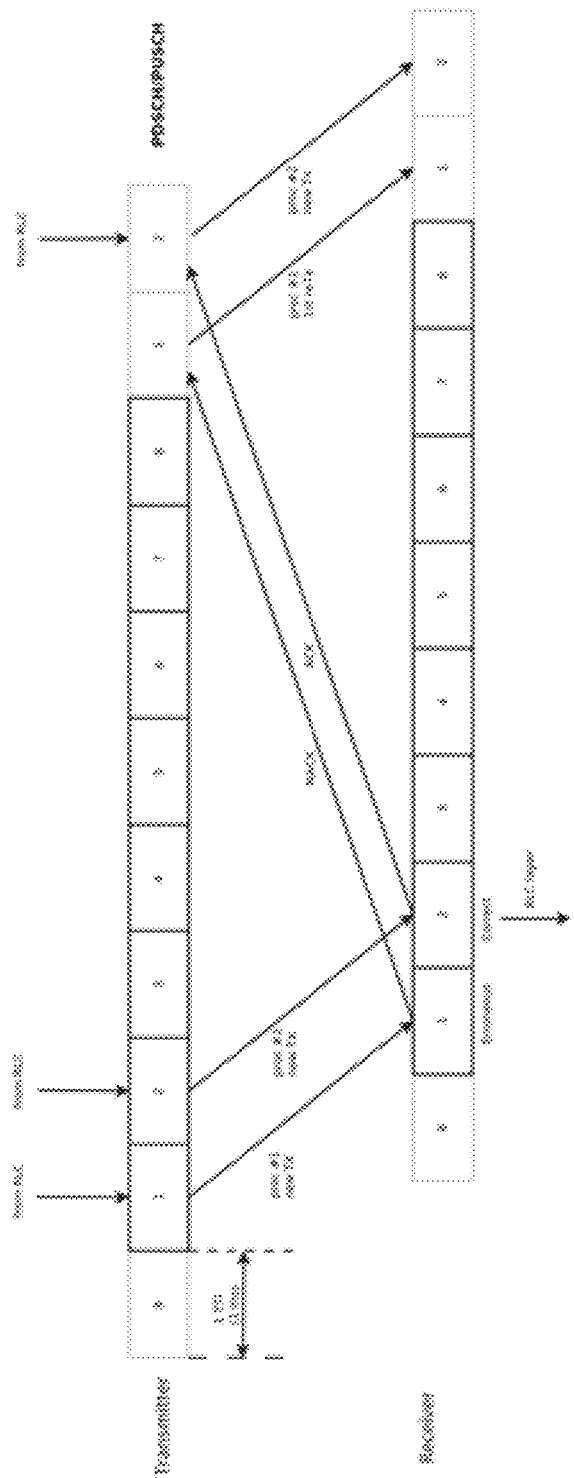
FIG. 3 illustrates HARQ operations in LTE.
Figure 4:
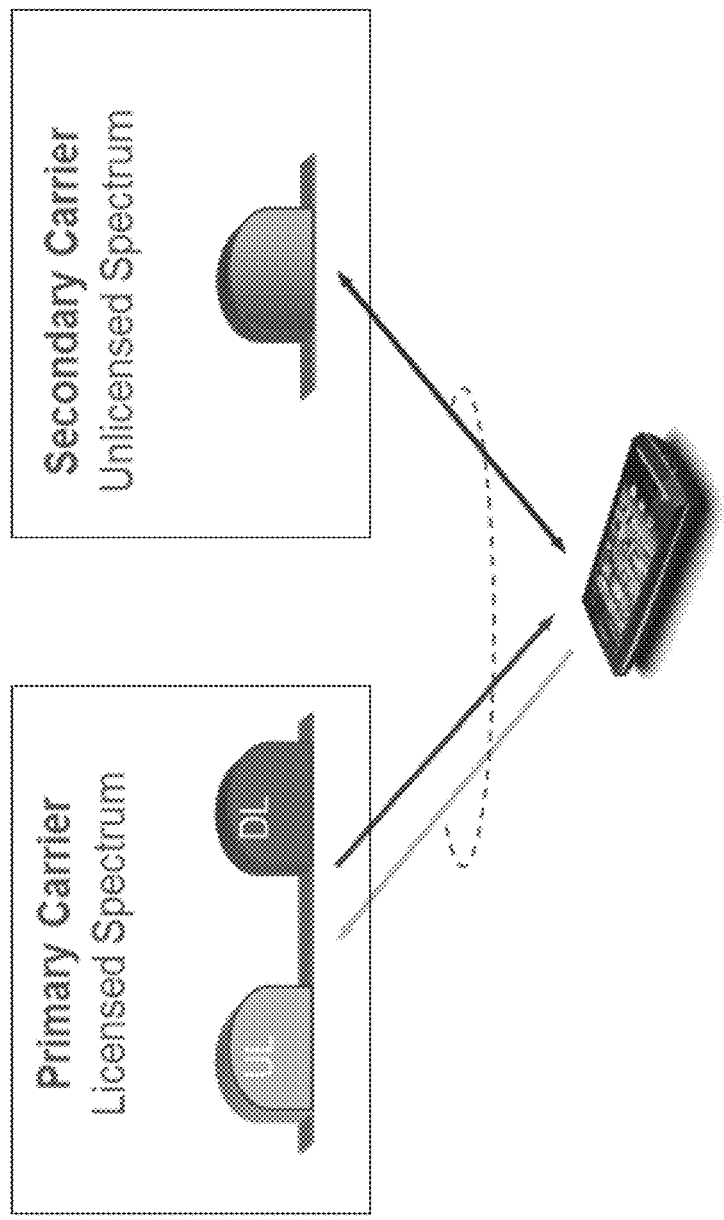
FIG. 4 illustrates LAA in unlicensed spectrum using LTE carrier aggregation.
Figure 5:
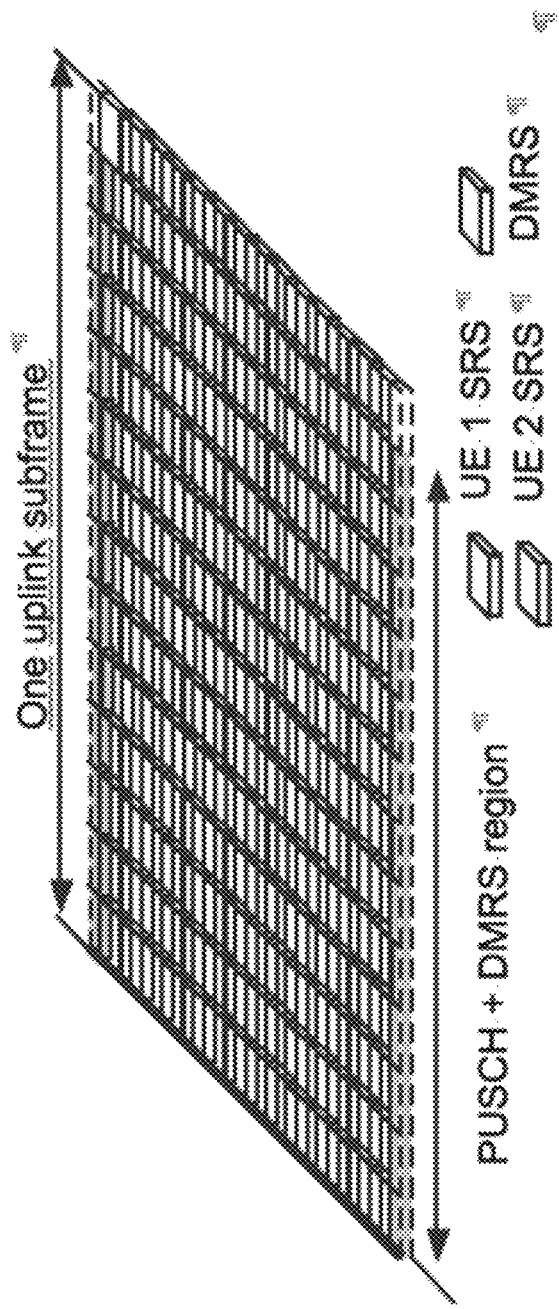
FIG. 5 illustrates multiplexing data and control information in PUSCH.
Figure 6:
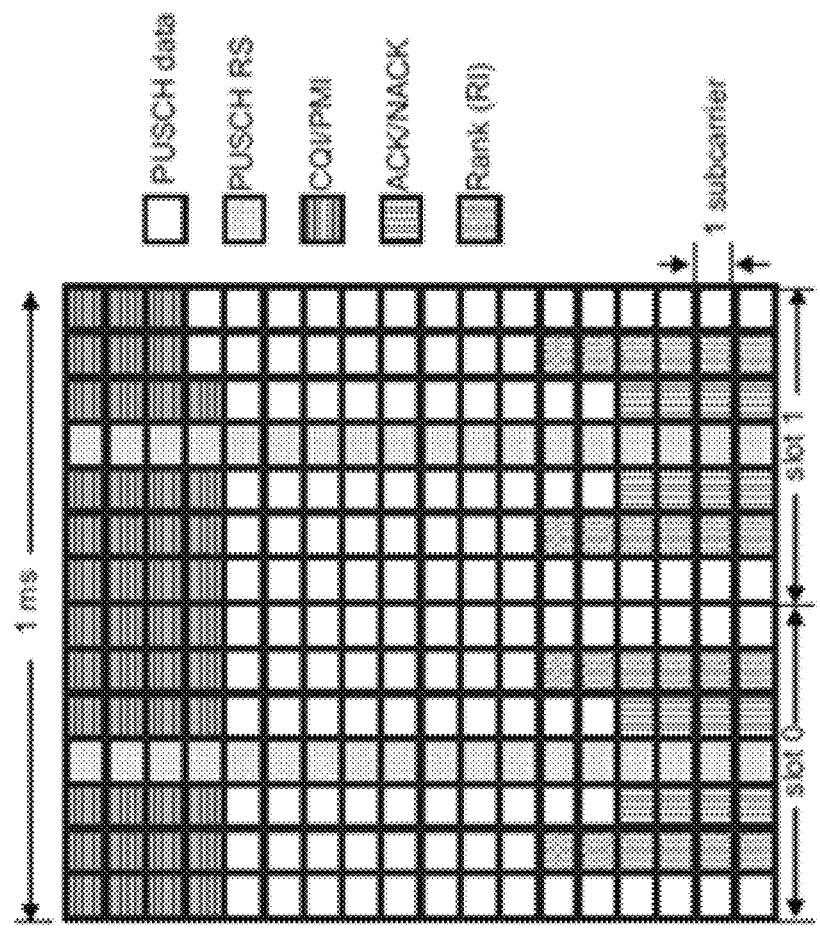
FIG. 6 illustrates multiplexing data and control information bits in PUSCH.
Figure 7:
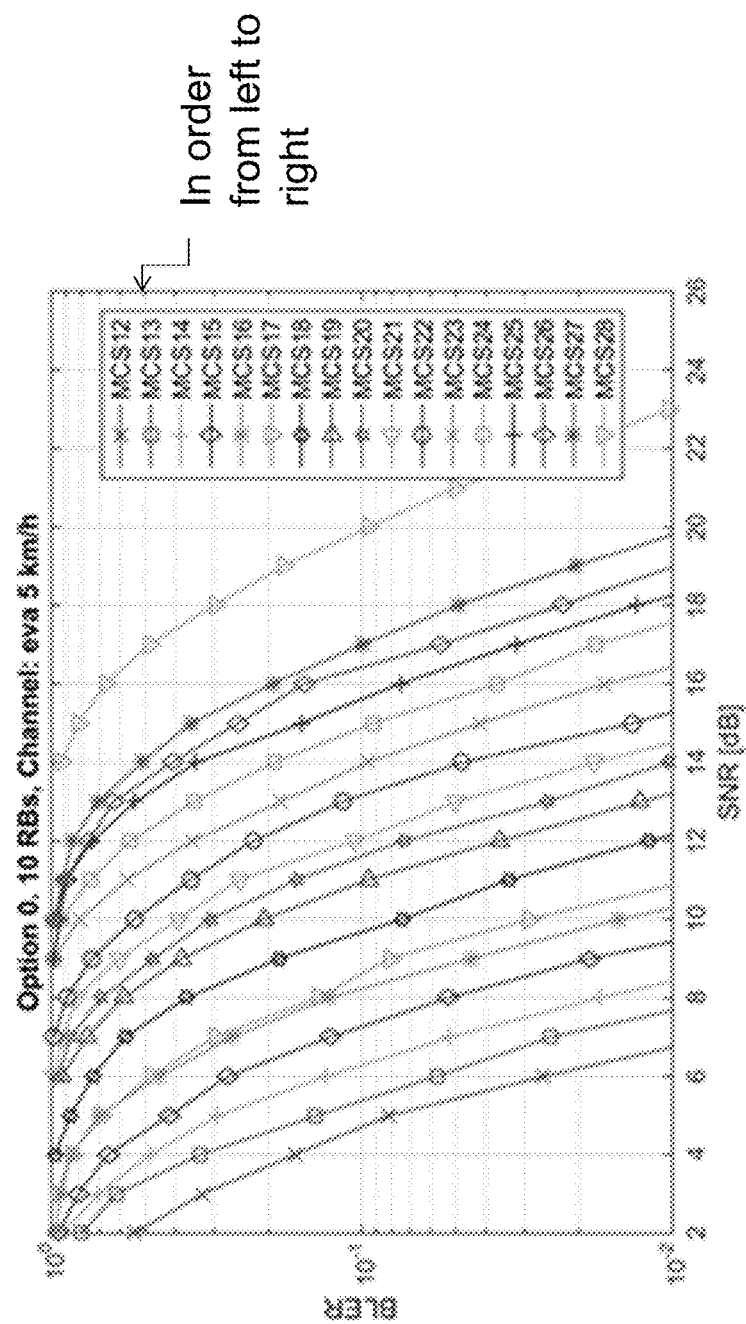
FIG. 7 illustrates transport block error rates (TBLER) of MCS 12-28 with 10-PRB PUSCH allocation without HARQ-ACK feedback puncturing on the EVA channel.
Figure 8:
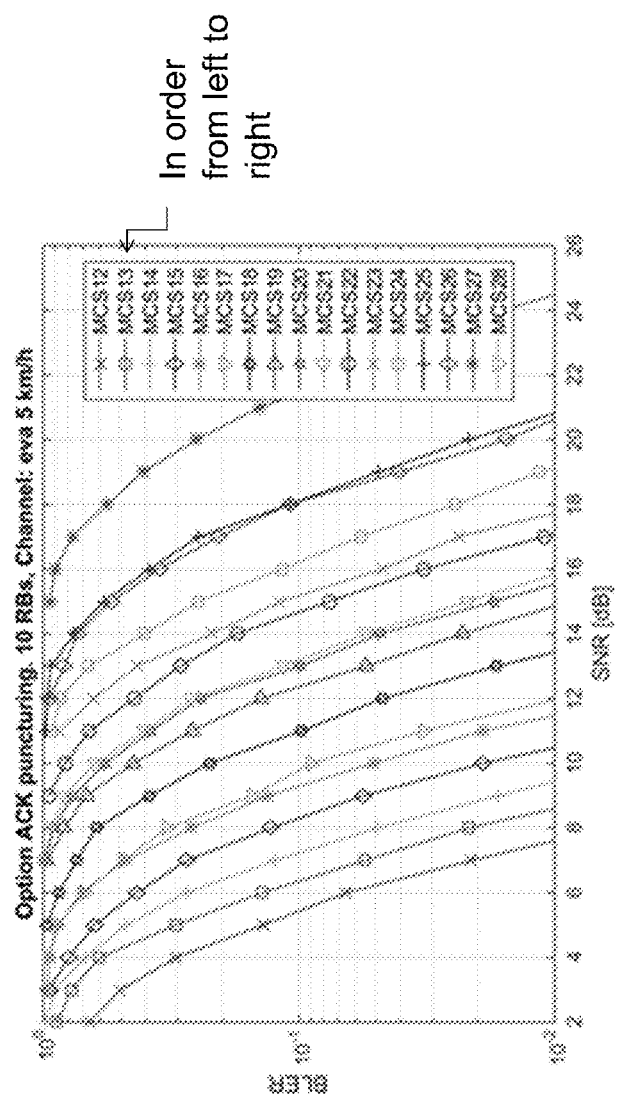
FIG. 8 illustrates TBLERs with 144 REs punctured by HARQ-ACK feedback.

FIG. 7 depicts the transport block error rates (TBLER) of MCS 12-28 with 10-PRB PUSCH allocation without HARQ-ACK feedback puncturing on the EVA channel. FIG. 8 depicts the corresponding TBLERs with 144 REs punctured by the HARQ-ACK feedback. It can be observed:
- 16 QAM and 64 QAM PUSCH MCSs suffer losses of at least 1 dB.
- The losses are higher for MCSs with higher coding rates. It is expected to see high performance losses when 256 QAM MCSs are introduced.
- MCS 28 has 100% TBLER and is not useable. MCS 25 also suffers very high performance losses due to unfavorable additional puncturing patterns.

As depicted, the HARQ-ACK feedback puncturing of PUSCH modulation symbols is concentrated in a code block. Moreover, the puncturing is on top of the LTE rate matching procedure and can result in puncturing patterns that are detrimental to the decoder's capability to recover the data bits reliably. For some MCSs, the additional puncturing patterns cause unexpected and substantially higher performance losses (e.g., MCS 25). The issue is that the signal is already at high code rate with carefully balanced rate matching patterns on the turbo code. The modulation symbol puncturing does not consider the turbo code structure and destroys the finely balanced rate matching patterns.

Certain embodiments of the disclosed subject matter may provide one or more technical benefits compared to conventional approaches. For example, improved methods of carrying HARQ-ACK feedback information in PUSCH may be provided, with a potential benefit of avoiding severe performance degradation when a large HARQ-ACK feedback size is used, and/or another potential benefit of avoiding excessive puncturing of the PUSCH data REs may be avoided. As a result, PUSCH transmission can have enhanced reliability and performance compared to conventional approaches.

Figure 9:
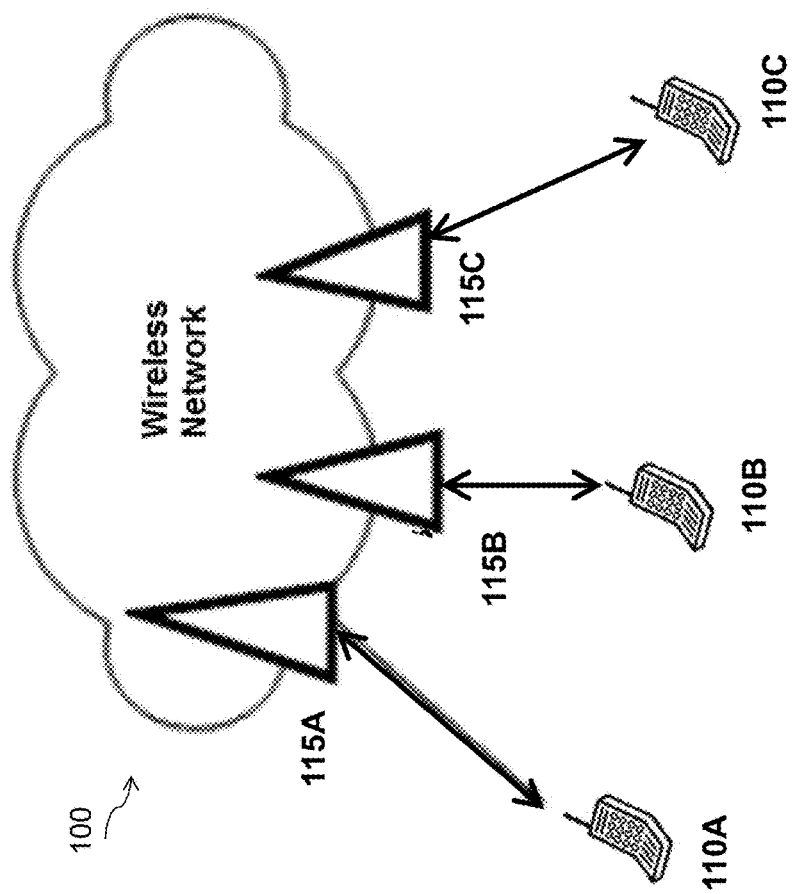
FIG. 9 illustrates an example wireless network for performing HARQ-ACK multiplexing procedures, in accordance with certain embodiments.

FIG. 9 is a block diagram illustrating a network 100 configured to perform SRS carrier-based switching for unlicensed carriers, in accordance with certain embodiments. Network 100 comprises one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 9). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a target device, mobile phone, a smart phone, a PDA (Personal Digital Assistant), a portable computer (e.g., laptop, tablet, iPad, smart phone), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication.

A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), radio base station, multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115, wireless devices 110, and other network nodes (such as radio network controller or core network node) are described in more detail with respect to FIGS. 10, 11, and 17, respectively.

Although FIG. 9 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Any of the above described nodes or devices may be considered a first node, second node, etc.

Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both LAA LTE and standalone LTE operation in license-exempt channels. The described techniques are generally applicable for transmissions from both network nodes 115 and wireless devices 110.

Figure 10:
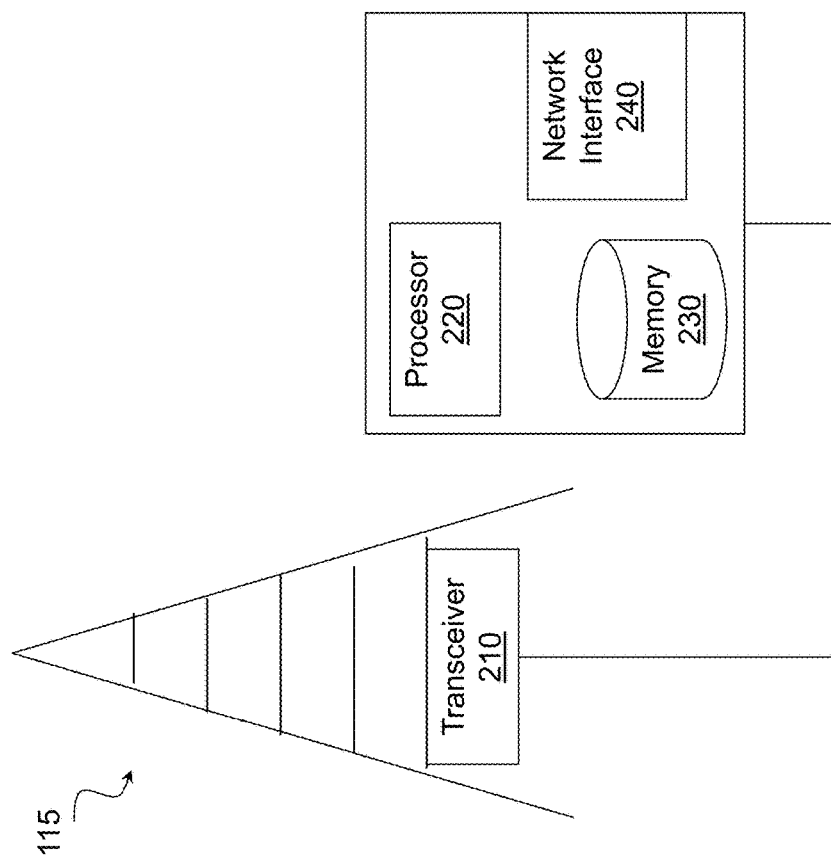
FIG. 10 illustrates an example network node configured to perform HARQ-ACK multiplexing procedures, in accordance with certain embodiments.

FIG. 10 illustrates an example network node 115 configured to perform SRS carrier-based switching for unlicensed carriers, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 11:
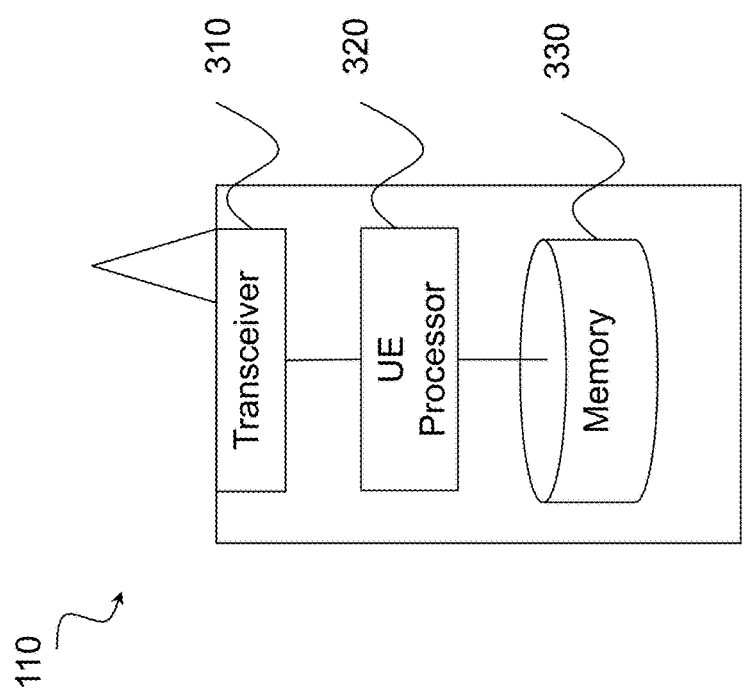
FIG. 11 illustrates an example wireless device configured to perform HARQ-ACK multiplexing procedures, in accordance with certain embodiments.

FIG. 11 illustrates an example wireless device 110 configured to perform various methods as described herein, in accordance with certain embodiments. As depicted, wireless device 110 includes transceiver 310, processor 320, and memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320. Examples of a network node 115 are provided above.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above).

According to certain LTE specifications (Section 5.2.2.8 of 3GPP TS 36.212, V13.0.0), data, CSI, RI and HARQ-ACK bits are assigned to different REs of the PUSCH based on a channel interleaving procedure. The steps can be summarized as follows:

The coded RI bits are first written into assigned RE positions.

The coded CSI and data bits are then written into remaining RE positions by avoiding those REs already occupied by the coded RI bits.

The coded HARQ-ACK bits are finally written into the assigned RE positions by overwriting RE positions that already contain coded data bits.

Figure 12:
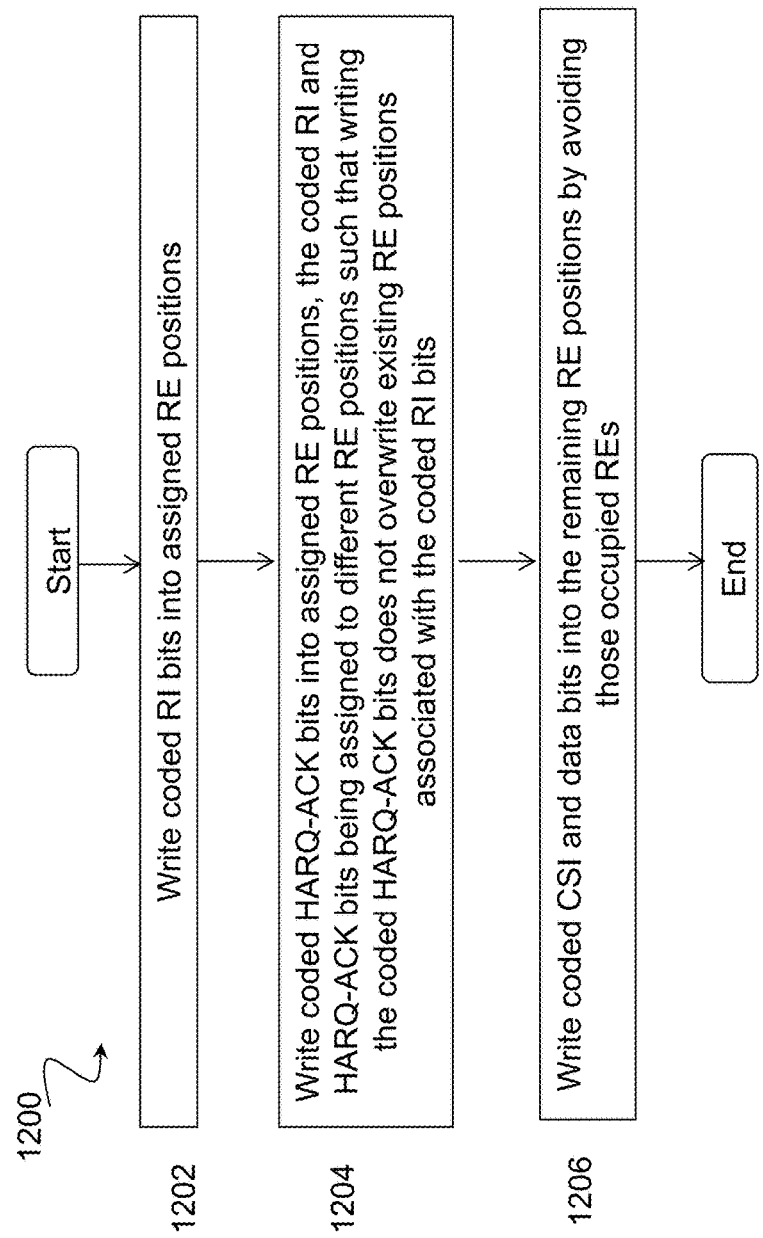
FIG. 12 illustrates a method for performing HARQ-ACK multiplexing procedures, in accordance with certain embodiments.

FIG. 12 illustrates a method for performing HARQ-ACK multiplexing procedures, according to certain embodiments. As depicted, the coded HARQ-ACK bits are written into assigned RE positions before coded CSI and data bits in a new channel interleaving procedure. The method begins at step 1202 when the coded RI bits are first written into the assigned RE positions. At step 1204, the coded HARQ-ACK bits are then written into the assigned RE positions. Note that coded RI and HARQ-ACK bits are assigned to different positions so the coded HARQ-ACK bits will not overwrite existing RE positions. At step 1206, the coded CSI and data bits are finally written into the remaining RE positions by avoiding those REs already occupied by the coded RI and HARQ-ACK bits. In certain embodiments, no other change is made to where the coded HARQ-ACK bits are placed.

In certain embodiments, the method for performing HARQ-ACK multiplexing procedures as described above with regard to FIG. 12 may be performed by a computer networking virtual apparatus. The virtual computing device may include modules for performing steps similar to those described above in relation to FIG. 12. For example, the computer networking virtual apparatus may include at least one writing module. In a particular embodiment, for example, at least one writing module may write the coded HARQ-ACK bits into the assigned RE positions before the coded CSI and data bits in a new channel interleaving procedure. In a particular embodiment, for example, at least one writing module may write the coded HARQ-ACK bits into the assigned RE positions. In a particular embodiment, for example, at least one writing module may write the coded CSI and data bits into the remaining RE positions by avoiding those REs already occupied by the coded RI and HARQ-ACK bits.

In some embodiments, one or more of the modules may be implemented using one or more processors of the nodes described above with regard to FIGS. 9, 10, and/or 11. In certain embodiments, the functions of two or more of the various modules may be combined into a single module. Additionally, the computer networking virtual apparatus may include additional components beyond the at least one writing module that may be responsible for providing certain aspects of functionality, including any of the functionality described above and/or any additional functionality (including any functionality necessary to support the solutions described above).

Figure 13:
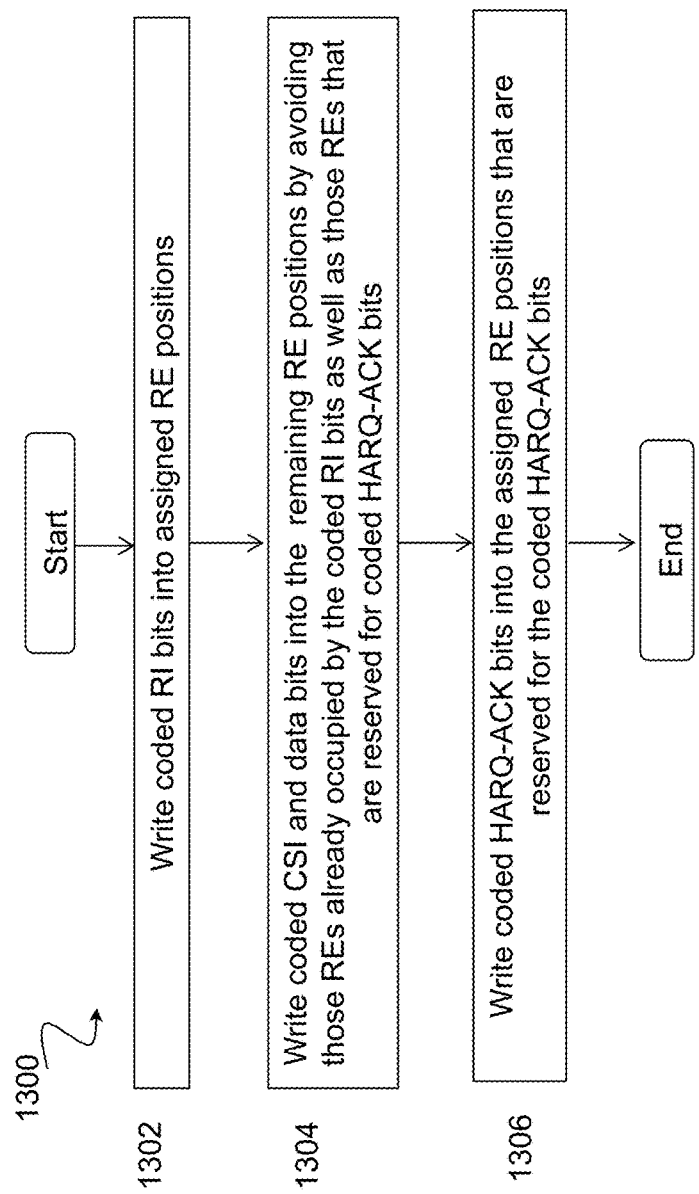
FIG. 13 illustrates another method for performing HARQ-ACK multiplexing procedures, in accordance with certain embodiments.

FIG. 13 illustrates another method for performing HARQ-ACK multiplexing procedures, according to certain embodiments. The method may ensure that the CSI and data bits avoid the HARQ-ACK bits even if they are written before the HARQ-ACK bits. The method begins at step 1302 when the coded RI bits are first written into the assigned RE positions. At step 1304, the coded CSI and data bits are then written into the remaining RE positions by avoiding those REs already occupied by the coded RI bits as well as those REs that will be occupied by the coded HARQ-ACK bits. At step 1306, the coded HARQ-ACK bits are finally written into the assigned RE positions. This will not overwrite any RE positions since RI and HARQ-ACK bits are assigned to different RE positions and the CSI and data bits avoided these HARQ-ACK RE positions. The method of FIG. 13 may provide a technical benefit in that the channel coding and rate matching procedure for the PUSCH data is instructed to produce fewer coded bits to accommodate the REs that will be occupied by the HARQ-ACK bits.

In certain embodiments, the method for performing HARQ-ACK multiplexing procedures as described above with regard to FIG. 13 may be performed by a computer networking virtual apparatus. The virtual computing device may include modules for performing steps similar to those described above with regard to the method illustrated and described in FIG. 13. For example, the computer networking virtual apparatus may include at least one writing module. In a particular embodiment, for example, at least one writing module may write the coded RI bits are first written into the assigned RE positions. In a particular embodiment, for example, at least one writing module may write the coded CSI and data bits into the remaining RE positions by avoiding those REs already occupied by the coded RI bits as well as those REs that will be occupied by the coded HARQ-ACK bits. In a particular embodiment, for example, at least one writing module may write the coded HARQ-ACK bits into the assigned RE positions such that no RE positions are overwritten since RI and HARQ-ACK bits are assigned to different RE positions and the CSI and data bits avoided these HARQ-ACK RE positions.

In some embodiments, one or more of the described modules may be implemented using one or more processors of the nodes described above with regard to FIGS. 9, 10, and/or 11. In certain embodiments, the functions of two or more of the various modules may be combined into a single module. Additionally, the computer networking virtual apparatus may include additional components beyond the at least one writing module that may be responsible for providing certain aspects of functionality, including any of the functionality described above and/or any additional functionality (including any functionality necessary to support the solutions described above).

Figure 14:
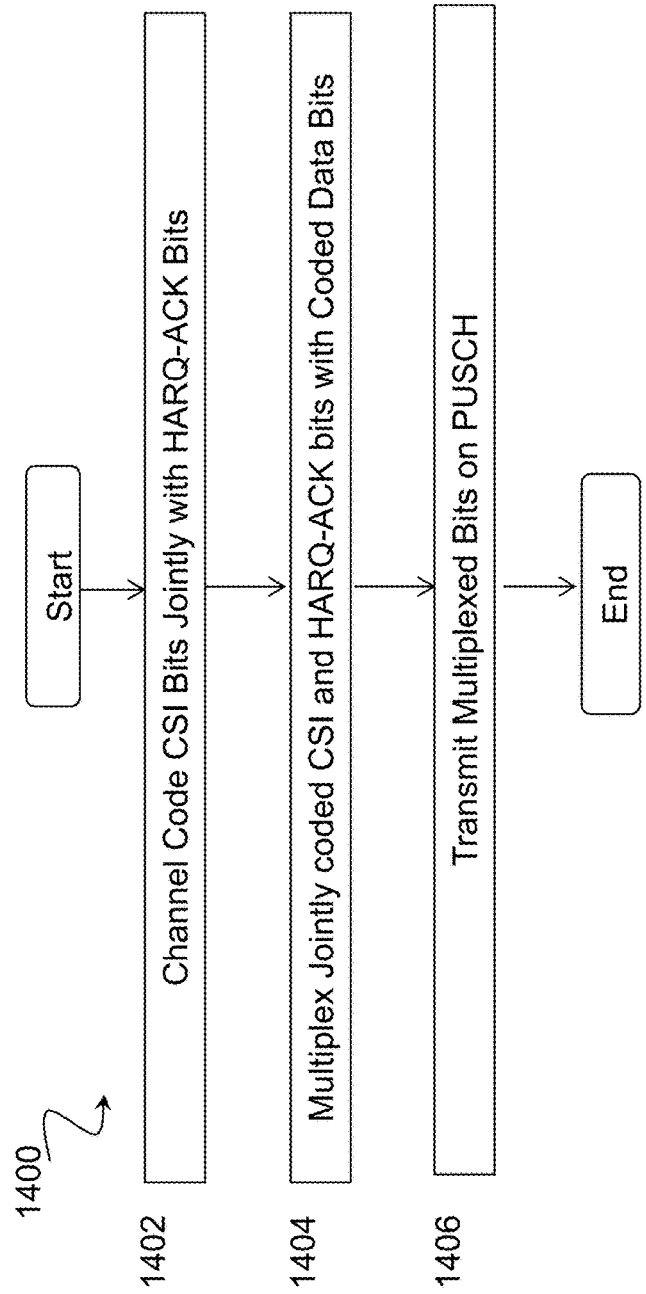
FIG. 14 illustrates another method for performing HARQ-ACK multiplexing procedures, in accordance with certain embodiments.

FIG. 14 illustrates another method for performing HARQ-ACK multiplexing procedures, in accordance with certain embodiments. The method comprises channel coding CSI bits jointly with HARQ-ACK bits (1402), multiplexing the jointly coded CSI and HARQ-ACK bits with coded data bits (1404), and transmitting the multiplexed coded CSI and HARQ-ACK bits and coded data bits on a PUSCH (1406). The CSI bits may comprise e.g. CQI bits.

In certain related embodiments, channel coding the CSI bits jointly with the HARQ-ACK bits comprises appending a sequence of HARQ-ACK bits at the end of a sequence of channel quality bits to produce a joint sequence, and channel coding the joint sequence.

In certain related embodiments, multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements. The assigning may comprise e.g. interleaving the coded CSI and HARQ-ACK bits with the coded data bits such that the coded CSI and HARQ-ACK bits are assigned to the first set of resource elements and the coded data bits are assigned to the second set of resource elements. The interleaving may comprise e.g. performing a channel interleaving procedure in which HARQ-ACK bits are treated as being absent.

In certain related embodiments, the method further comprises receiving higher layer signaling from a radio network node, the higher layer signaling (e.g. RRC signaling) indicating that the assigning is to be performed, and performing the assigning in response to the higher layer signaling. The multiplexing could alternatively be triggered by PDCCH or ePDCCH signaling.

In certain embodiments, the method further comprises determining whether the number of HARQ-ACK bits or coded HARQ-ACK bits is greater than a threshold value, and performing the channel coding HARQ-ACK bits jointly with the CSI bits as a consequence of the determining. The threshold value could be e.g. 22.

The methods described above in relation to FIGS. 12-14 could be performed by e.g. a wireless communication device such as that described above in relation to FIG. 11 or any suitable alternative. In some such embodiments, the various steps of FIGS. 12-14 could be performed by modules, where the term "module" may refer to any suitable combination of hardware and/or software configured to perform a designated function. For instance, a wireless communication device for performing the method of FIG. 14 could comprise a channel coding module, a multiplexing module, and a transmitting module for performing steps 1402, 1404, and 1406, respectively.

Figure 15:
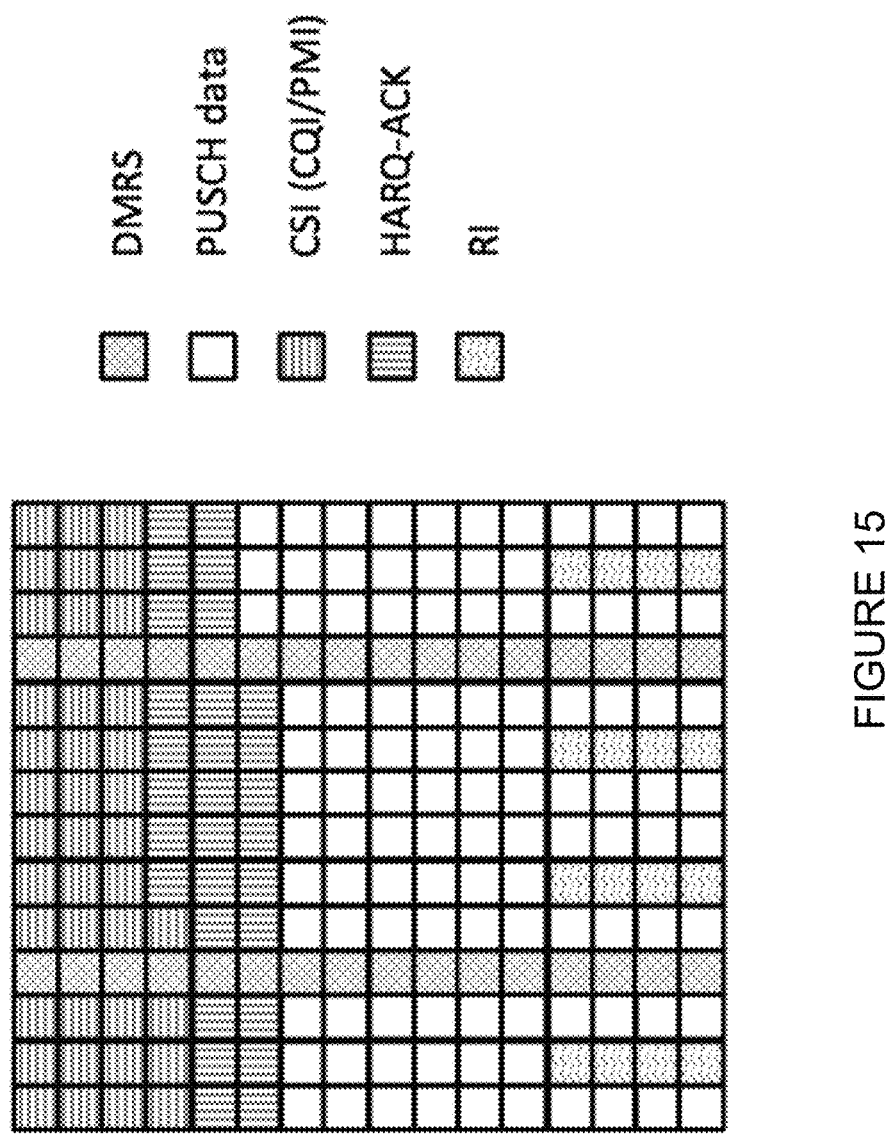
FIG. 15 illustrates one non-limiting example where the coded HARQ-ACK bits are placed after the coded CSI bits but before the coded data bits, in accordance with certain embodiments.
Figure 16:
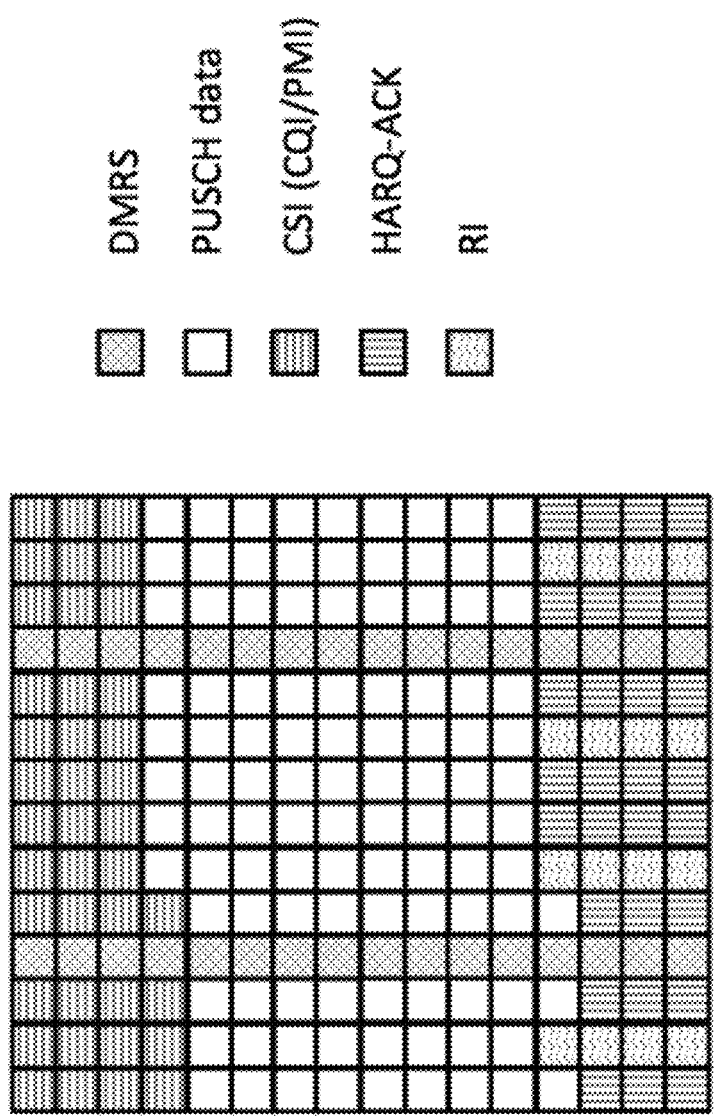
FIG. 16 illustrates another non-limiting example where the coded HARQ-ACK bits are placed after the coded CSI bits and the coded data bits, in accordance with certain embodiments.

FIG. 15 illustrates one non-limiting example where the coded HARQ-ACK bits are placed (i.e. assigned to resource elements, or in other words, subjected to some form of processing such that they end up being conveyed by those resource elements) after the coded CSI bits but before the coded data bits. FIG. 16 illustrates another non-limiting example where the coded HARQ-ACK bits are placed after the coded CSI bits and the coded data bits.

According to certain embodiments, the examples of FIGS. 15 and 16 include flowing coded HARQ-ACK bits with the coded data bits like the coded CSI bits. That is, the {g} bits into the channel interleaver consist of coded CSI bits, followed by coded HARQ-ACK bits and followed by coded data bits. The rest of the channel interleaver procedure can be reused by treating the $\{q^{ACK}\}$ bits as absent. Instead, the "Data and control multiplexing" section of 3GPP TS 36.212, V13.0.0 may be changed to multiplex these three different types of coded bits together.

Figure 17:
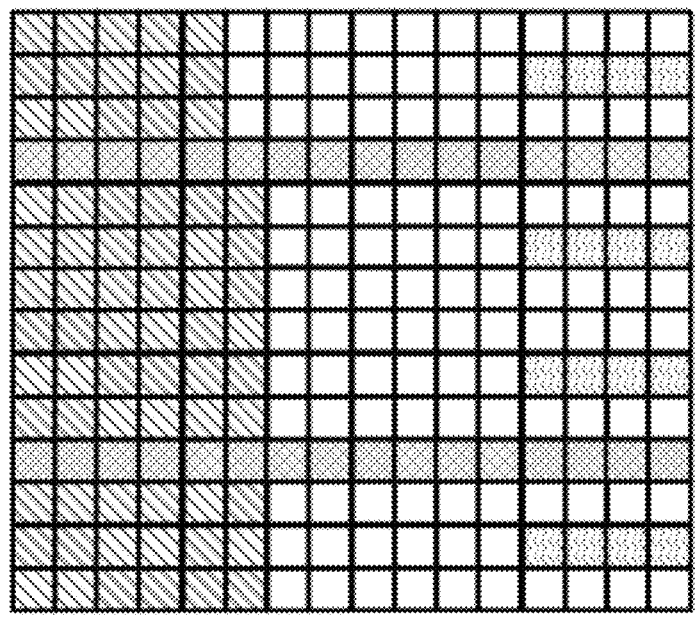
FIG. 17 illustrates a non-limiting example for multiplexing jointly coded CSI and HARQ-ACK bits with the coded data bits, in accordance with certain embodiments.

According certain other embodiments, the HARQ-ACK bits and the CSI bits may be channel coded jointly. FIG. 17 illustrates a non-limiting example for multiplexing jointly coded CSI and HARQ-ACK bits with the coded data bits. Thus, CSI and HARQ-ACK bits may be coded jointly. This also allows the channel interleaver procedure to be reused by treating the $\{q^{ACK}\}$ bits as absent. Instead, the channel coding sections of the CSI and HARQ-ACK bits in 3GPP TS 36.212, V13.0.0 may be changed.

It is one feature of any of the embodiments described above that the new procedure is practiced when the number of HARQ-ACK bits, $0^{ACK}$, is greater than a threshold. In one non-limiting implementation, the threshold is 22 bits.

It is another feature of any of the embodiment that the new procedure is practiced when the number of channel coded HARQ-ACK bits, $Q'_{ACK}$, is greater than a threshold.

It is yet another feature of any of the embodiment that the new procedure is practiced when the HARQ-ACK feedback carried in the PUSCH is triggered by a control channel. In one non-limiting implementation, said control channel is the PDCCH. In another non-limiting implementation, said control channel is the EPDCCH.

It is further one feature of any of the embodiment that the new procedure is practiced if it is configured by higher layer signaling. One non-limiting implementation of the higher layer signaling is the LTE RRC signaling.

Figure 18:
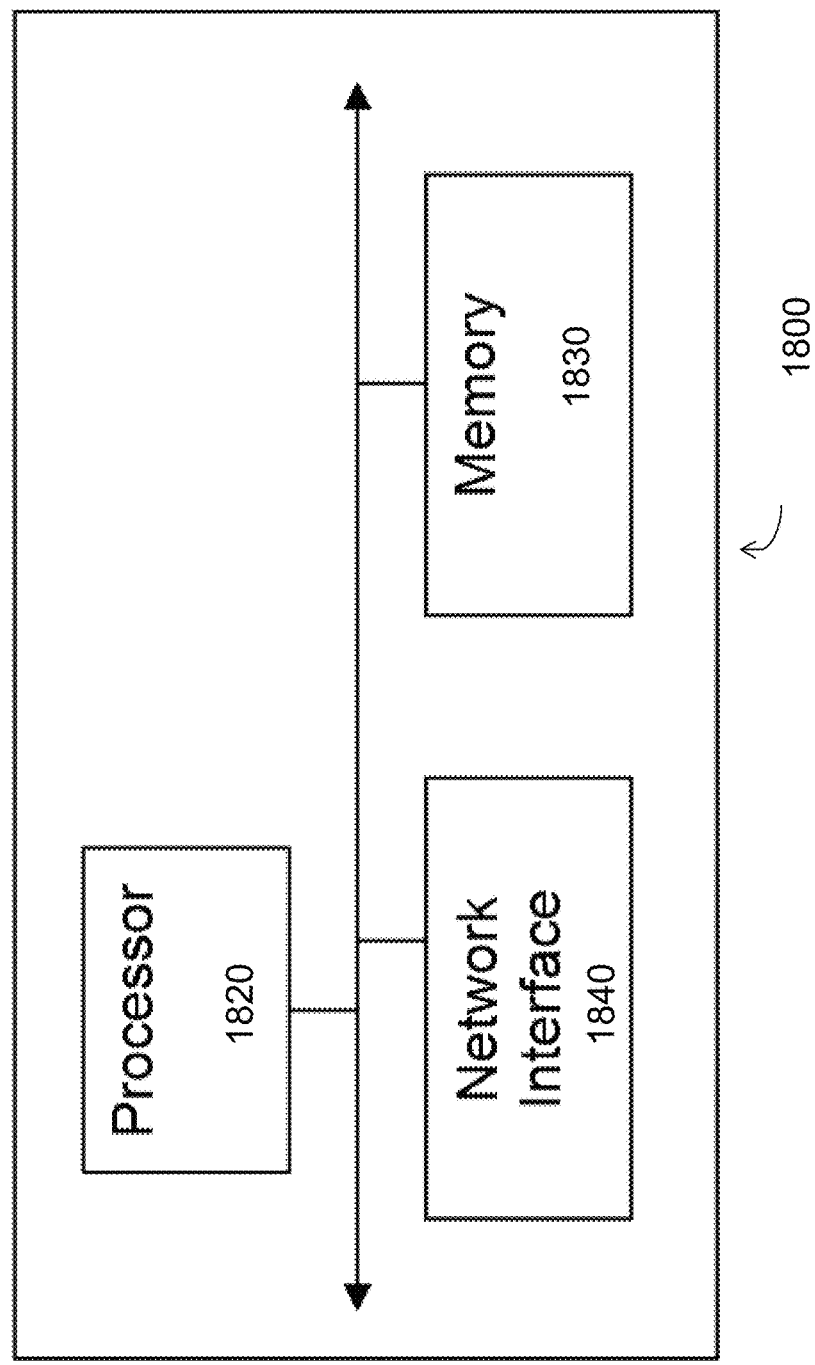
FIG. 18 illustrates an example radio network controller or core network node, in accordance with certain embodiments.

FIG. 18 illustrates an example radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1800 includes processor 1820, memory 1830, and network interface 1840. In some embodiments, processor 1820 executes instructions to provide some or all of the functionality described above as being provided by the network node, memory 1830 stores the instructions executed by processor 1820, and network interface 1840 communicates signals to any suitable node, such as a gateway, switch, router, Internet, Public Switched Telephone Network (PSTN), network nodes 115, radio network controllers or core network nodes 1800, etc.

Processor 1820 may include any suitable combination of hardware and software implemented in one or more modules to execute instructions and manipulate data to perform some or all of the described functions of the radio network controller or core network node 1800. In some embodiments, processor 1820 may include, for example, one or more computers, one or more central processing units (CPUs), one or more microprocessors, one or more applications, and/or other logic.

Memory 1830 is generally operable to store instructions, such as a computer program, software, an application including one or more of logic, rules, algorithms, code, tables, etc. and/or other instructions capable of being executed by a processor. Examples of memory 1830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1840 is communicatively coupled to processor 1820 and may refer to any suitable device operable to receive input for the network node, send output from the network node, perform suitable processing of the input or output or both, communicate to other devices, or any combination of the preceding. Network interface 1840 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

The following is a list of acronyms that may be used in this written description.
CA Carrier aggregation
UCI Uplink control information
PUCCH Physical uplink control channel
LTE Long term evolution
TDD Time domain duplex
FDD Frequency domain duplex
UL Uplink
DL Downlink
UE User equipment
LAA Licensed-Assisted Access
TPC Transmit power control
DCI Downlink control information
PDCCH Physical downlink control channel
ePDCCH Enhanced physical downlink control channel
DAI Downlink Assignment index
HARQ Hybrid Automatic Repeat request
Ack Acknowledgement
NACK Negative-ACK
eNB Evolved Node B While the disclosed subject matter has been presented above with reference to various embodiments, it will be understood that various changes in form and details may be made to the described embodiments without departing from the overall scope of the disclosed subject matter.

What is claimed:

1. A method of operating a wireless communication device, comprising:
channel coding Channel State Information (CSI) bits jointly with Hybrid Automatic Repeat Request (HARQ) Acknowledgement (HARQ-ACK) bits, wherein channel coding the CSI bits jointly with the HARQ-ACK bits comprises appending a sequence of HARQ-ACK bits at the end of a sequence of channel quality bits to produce a joint sequence, and channel coding the joint sequence;
multiplexing the jointly coded CSI and HARQ-ACK bits with coded data bits, wherein multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements, and wherein the assigning comprises interleaving the coded CSI and HARQ-ACK bits with the coded data bits such that the coded CSI and HARQ-ACK bits are assigned to the first set of resource elements and the coded data bits are assigned to the second set of resource elements; and
transmitting the multiplexed coded CSI and HARQ-ACK bits and coded data bits on a physical uplink shared channel (PUSCH).

2. The method of claim 1, wherein the CSI bits comprise channel quality indication (CQI) bits.

3. The method of claim 1, wherein the interleaving comprises performing a channel interleaving procedure in which HARQ-ACK bits are treated as being absent.

4. The method of claim 1, further comprising:
receiving higher layer signaling from a radio network node, the higher layer signaling indicating that the assigning is to be performed; and
performing the assigning in response to the higher layer signaling.

5. The method of claim 1, wherein the multiplexing is triggered by physical downlink control channel (PDCCH) or enhanced physical downlink control channel (ePDCCH) signaling.

6. The method of claim 1, further comprising:
determining whether the number of HARQ-ACK bits or coded HARQ-ACK bits is greater than a threshold value; and
performing the channel coding HARQ-ACK bits jointly with the CSI bits as a consequence of the determining.

7. The method of claim 6, wherein the threshold value is 22.

8. A wireless communication device, comprising:
at least one memory, at least one processor, and at least one transceiver collectively configured to:
channel code Channel State Information (CSI) bits jointly with Hybrid Automatic Repeat Request (HARQ) Acknowledgement (HARQ-ACK) bits, wherein channel coding the CSI bits jointly with the HARQ-ACK bits comprises appending a sequence of HARQ-ACK bits at the end of a sequence of channel quality bits to produce a joint sequence, and channel coding the joint sequence;
multiplex the jointly coded CSI and HARQ-ACK bits with coded data bits, wherein multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements, and wherein the assigning comprises interleaving the coded CSI and HARQ-ACK bits with the coded data bits such that the coded CSI and HARQ-ACK bits are assigned to the first set of resource elements and the coded data bits are assigned to the second set of resource elements; and
transmit the multiplexed coded CSI and HARQ-ACK bits and coded data bits on a physical uplink shared channel (PUSCH).

9. The wireless communication device of claim 8, wherein the CSI bits comprise channel quality indication (CQI) bits.

10. The wireless communication device of claim 8, wherein the interleaving comprises performing a channel interleaving procedure in which HARQ-ACK bits are treated as being absent.

11. The wireless communication device of claim 8, wherein the at least one memory, at least one processor, and at least one transceiver are further collectively configured to receive higher layer signaling from a radio network node, the higher layer signaling indicating that the assigning is to be performed, and perform the assigning in response to the higher layer signaling.

12. The wireless communication device of claim 8, wherein the multiplexing is triggered by physical downlink control channel (PDCCH) or enhanced physical downlink control channel (ePDCCH) signaling.

13. The wireless communication device of claim 8, wherein the at least one memory, at least one processor, and at least one transceiver are further collectively configured to determine whether the number of HARQ-ACK bits or coded HARQ-ACK bits is greater than a threshold value, and to perform the channel coding HARQ-ACK bits jointly with the CSI bits as a consequence of the determining.

14. The wireless communication device of claim 13, wherein the threshold value is 22.

15. A wireless communication device, comprising:
at least one memory, at least one processor, and at least one transceiver collectively configured to:
channel code Channel State Information (CSI) bits jointly with Hybrid Automatic Repeat Request (HARQ) Acknowledgement (HARQ-ACK) bits, wherein channel coding the CSI bits jointly with the HARQ-ACK bits comprises appending a sequence of HARQ-ACK bits at the end of a sequence of channel quality bits to produce a joint sequence, and channel coding the joint sequence;
multiplex the jointly coded CSI and HARQ-ACK bits with coded data bits, wherein multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements, and
transmit the multiplexed coded CSI and HARQ-ACK bits and coded data bits on a physical uplink shared channel (PUSCH),
wherein the at least one memory, at least one processor, and at least one transceiver are further collectively configured to receive higher layer signaling from a radio network node, the higher layer signaling indicating that the assigning is to be performed, and perform the assigning in response to the higher layer signaling.

16. A wireless communication device, comprising:
at least one memory, at least one processor, and at least one transceiver collectively configured to:
channel code Channel State Information (CSI) bits jointly with Hybrid Automatic Repeat Request (HARQ) Acknowledgement (HARQ-ACK) bits, wherein channel coding the CSI bits jointly with the HARQ-ACK bits comprises appending a sequence of HARQ-ACK bits at the end of a sequence of channel quality bits to produce a joint sequence, and channel coding the joint sequence;
multiplex the jointly coded CSI and HARQ-ACK bits with coded data bits, wherein multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements, and
transmit the multiplexed coded CSI and HARQ-ACK bits and coded data bits on a physical uplink shared channel (PUSCH),
wherein the multiplexing is triggered by physical downlink control channel (PDCCH) or enhanced physical downlink control channel (ePDCCH) signaling.

17. A wireless communication device, comprising:
at least one memory, at least one processor, and at least one transceiver collectively configured to:
channel code Channel State Information (CSI) bits jointly with Hybrid Automatic Repeat Request (HARQ) Acknowledgement (HARQ-ACK) bits, wherein channel coding the CSI bits jointly with the HARQ-ACK bits comprises appending a sequence of HARQ-ACK bits at the end of a sequence of channel quality bits to produce a joint sequence, and channel coding the joint sequence;
multiplex the jointly coded CSI and HARQ-ACK bits with coded data bits, wherein multiplexing the jointly coded CSI and HARQ-ACK bits with coded data bits comprises assigning the jointly coded CSI and HARQ-ACK bits for transmission on a first set of resource elements in the PUSCH, and thereafter assigning the coded data bits for transmission on a second set of resource elements in the PUSCH, wherein the first and second sets of resource elements do not include any of the same resource elements, and
transmit the multiplexed coded CSI and HARQ-ACK bits and coded data bits on a physical uplink shared channel (PUSCH),
wherein the at least one memory, at least one processor, and at least one transceiver are further collectively configured to determine whether the number of HARQ-ACK bits or coded HARQ-ACK bits is greater than a threshold value, and to perform the channel coding HARQ-ACK bits jointly with the CSI bits as a consequence of the determining.

* * * * *